US011358371B2

(12) United States Patent
Iwai et al.

(10) Patent No.: US 11,358,371 B2
(45) Date of Patent: Jun. 14, 2022

(54) IMAGE SURFACE PROTECTION STRUCTURE OF A PAINTING

(71) Applicants: Kikuko Iwai, Chiba (JP); Kie Iwai, Chiba (JP)

(72) Inventors: Kikuko Iwai, Chiba (JP); Kie Iwai, Chiba (JP)

(*) Notice: Subject to any disclaimer, the term of this patent is extended or adjusted under 35 U.S.C. 154(b) by 172 days.

(21) Appl. No.: 16/670,325

(22) Filed: Oct. 31, 2019

(65) Prior Publication Data

US 2020/0139753 A1 May 7, 2020

(30) Foreign Application Priority Data

Nov. 1, 2018 (JP) .............................. JP2018-206918

(51) Int. Cl.
*B32B 17/06* (2006.01)
*B32B 27/30* (2006.01)

(52) U.S. Cl.
CPC ............ *B32B 17/06* (2013.01); *B32B 17/061* (2013.01); *B32B 27/30* (2013.01)

(58) Field of Classification Search
CPC ........ B32B 17/061; B32B 17/06; B32B 27/30
USPC ...................................................... 428/195.1
See application file for complete search history.

(56) References Cited

U.S. PATENT DOCUMENTS

| 2010/0122927 A1* | 5/2010 | Matsuoka | ............ B65D 75/366 |
| | | | 206/438 |
| 2011/0168949 A1* | 7/2011 | Hackney | .................. B44D 7/00 |
| | | | 252/400.53 |
| 2015/0000824 A1* | 1/2015 | Osamura | ..................... C09J 7/22 |
| | | | 156/94 |
| 2019/0270864 A1* | 9/2019 | Noguchi | ................... C08K 5/00 |
| 2020/0139753 A1* | 5/2020 | Iwai | ......................... B44D 7/00 |

FOREIGN PATENT DOCUMENTS

| JP | S51-136845 A | 11/1976 |
| JP | S57-146702 A | 9/1982 |
| JP | S61-104900 A | 5/1986 |
| JP | H10-85593 A | 4/1998 |
| JP | 2000-5596 A | 1/2000 |
| JP | 2000-168846 A | 6/2000 |
| JP | 2003-094900 A | 4/2003 |
| JP | 2009-234148 A | 10/2009 |
| JP | 2013-240957 A | 12/2013 |
| WO | WO-2018088206 A1 * | 5/2018 ............ C08L 101/00 |

OTHER PUBLICATIONS

Extended European Search Report issued for the counterpart European Patent Application No. 19205222.3 dated Mar. 23, 2020.
Cennino Chennini, Book of Art—Theory of Painting Technique, p. 133-135 Chap 155-156; Chuo Koron Fine Art Publishers, pp. 166-167, 1976.

* cited by examiner

*Primary Examiner* — Betelhem Shewareged
(74) *Attorney, Agent, or Firm* — IP Business Solutions, LLC

(57) ABSTRACT

An image surface protection structure of a painting capable of protecting the image surface layer of a painting from dirt and physical damage without impairing the original color or texture of the image surface of the paint layer is provided. An image surface protection structure of a painting comprising: a sealed space having an oxygen concentration of 4% or less, formed from a transparent hard plate and a gas barrier material; a painting placed in the sealed space, with the image surface of it facing the transparent hard plate.

12 Claims, 6 Drawing Sheets

IMAGE SURFACE PROTECTION STRUCTURE OF A PAINTING

FIELD OF INVENTION

The present invention relates to an image surface protection structure of a painting.

BACKGROUND OF THE INVENTION

In general, oil paintings are composed of overlaying a stretcher bar, a support (a canvas made of linen, etc.), a filler layer, a ground layer, a paint layer, and a varnish layer in this order The varnish layer has the function of protecting the image surface of the paint layer from dirt and physical injuries such as scratches and the like, and since long ago, various techniques have been studied with regard to methods of applying the varnish and the like (for example, refer to Non-Patent Document 1 etc.)

In the 18th and 19th centuries, natural resins were mainly used as resin components in varnishes. Varnishes using natural resins have the disadvantage that they turn yellow with age and the original color of the paint layer is impaired. For this reason, since the 20th century, synthetic resins have been used for the most part as the resin components in varnishes. Varnishes made of synthetic resin are not easily yellowed, but there is a drawback that overlaying synthetic varnish on the paint layer will damage the texture intended by the painter (such as brush strokes, surface gloss, color overlap, etc.) in the original painting.

CITATION LIST

Non-Patent Literature

C. Chennini (Author), Atsushi Nakamura (Translator), Kuei Fujii (Translator): Book of Art-Theory of Painting Technique—Chuo Koron Fine Art Publishers, pp 166-167 (1976)

SUMMARY OF THE INVENTION

Technical Problem

The present invention has been made in view of such circumstances and comprises an image surface protection structure which can protect the image surface of the paint layer from dirt and physical injury without damaging the original color or texture of the image surface of the paint layer.

Solution to Problem

The present invention offers the following [1]~[10].

[1] An image surface protection structure of a painting comprising: a sealed space having an oxygen concentration of 4% or less, formed from a transparent hard plate and a gas barrier material; a painting placed in the sealed space, with the image surface of it facing the transparent hard plate.

[2] The image surface protection structure of a painting of [1], wherein an oxygen absorbing agent is enclosed inside the sealed space with the painting, and the oxygen absorbing agent is placed on the back side of the painting.

[3] The image surface protection structure of a painting of [1] or [2], wherein the relative humidity of the sealed space is 40 to 65% RH.

[4] The image surface protection structure of a painting of [2] or [3], wherein the oxygen absorbing agent is an organic oxygen absorbing agent.

[5] The image surface protection structure of a painting of any one of [1] to [4], wherein the gas barrier material is at least one selected from a metal and a vapor deposition film.

[6] The image surface protection structure of a painting of any one of [1] to [5], wherein the gas barrier material possesses the form of a tray or a film.

[7] The image surface protection structure of a painting of [5] or [6], wherein the metal is aluminum.

[8] The image surface protection structure of a painting of [5] or [6], wherein the vapor deposition film is at least one selected from an aluminum vapor deposition resin film and a silicon oxide vapor deposition resin film.

[9] The image surface protection structure of a painting of any one of [1] to [8], wherein the transparent hard plate is selected from the group consisting of a glass plate, a polycarbonate plate e, and an acrylic resin plate.

[10] The image surface protection structure of a painting of [9] wherein the glass plate is made of low reflection glass or low reflection strengthened glass.

Advantageous Effects of Invention

According to the present invention, the surface of the paint layer can be protected from dirt, physical injury and the like without damaging the original color and texture of the paint layer.

DETAILED DESCRIPTION

Following, the image surface protection structure of a painting of one embodiment of the present invention will be described in detail. However, the present invention is in no sense limited to the present embodiments. In the following description, the expression "A to B" indicates a numerical range including the endpoints A and B. That is, it means "A or more and B or less" (when A<B) or "A or more and B or less" (when A>B).

Figure 1:
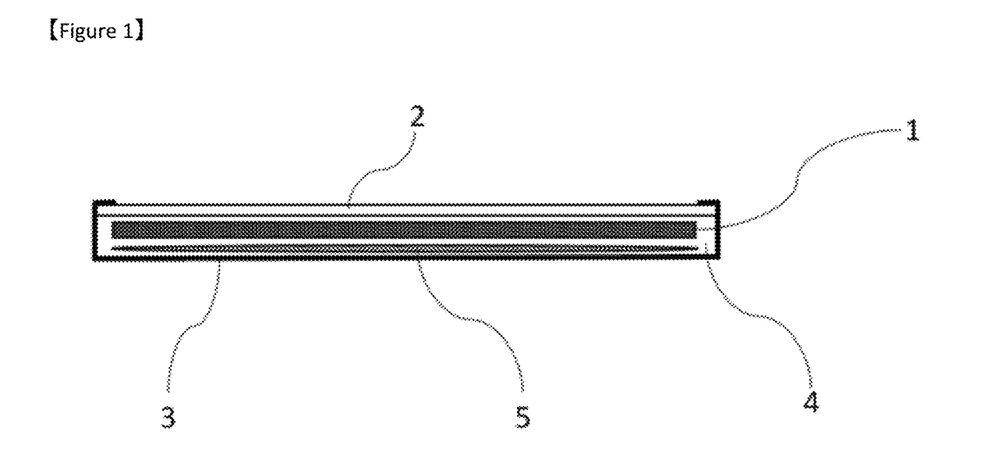
FIG. 1 is a drawing explaining the image surface protection structure of a painting according to an embodiment of the present invention.

In the present invention, as shown in FIG. 1, painting 1 is enclosed in sealed space 4 having an oxygen concentration of 4% or less and formed of transparent hard plate 2 and gas barrier material 3. In sealed space 4, placing the oxygen absorbing agent 5 on the back side of the painting 1 is preferable.

The configuration of layers of the painting is not particularly limited, but a configuration wherein there is a paint layer on a support (a canvas made of linen or the like) may be exemplified.

Painting 1 is placed a position where the image surface (the surface of the paint layer) faces transparent hard plate 2.

As described above, the oxygen concentration of sealed space 4 is 4% or less, preferably 2% or less, more preferably 1% or less, and particularly preferably 0.1% or less.

Thus, by adjusting the positioning of the painting in the substantially oxygen-free sealed space, it is possible to avoid oxidation of the support and/or the paint layer.

As a method of setting the oxygen concentration of the sealed space 4 to 4% or less, in addition to the method of enclosing the oxygen absorbing agent 5 with the painting 1 in the sealed space 4, the method of carrying out gas replacement with an inert gas such as nitrogen or argon may be used.

Although oxygen absorbing agent 5 is used in the present embodiment, the use of the oxygen absorbing agent 5 is not essential, and the oxygen concentration in the sealed space 4 may made to be 4% or less using only gas replacement. When the oxygen absorbing agent 5 and the gas replacement described above are used in combination, the amount of the oxygen absorbing agent 5 used can be reduced.

Oxygen absorbing agent 5 removes oxygen by a chemical reaction. Oxygen absorbing agent 5 includes an iron-based oxygen absorbing agent containing iron powder as a main component and an organic oxygen absorbing agent that does not use iron powder. As examples of organic oxygen absorbing agents, those containing ascorbic acid as a main agent (JP S51-136845 A), those that containing phenols (such as phenol, catechol, pyrogallol, cresol, etc.) as a main agent (JP H10-85593 A), and those containing an aliphatic hydrocarbon having an unsaturated group as a main agent (JP 2000-5596 A) are known. Since iron-based oxygen absorbing agents, organic oxygen absorbing agents based on ascorbic acid, and organic oxygen absorbing agents based on phenols all require water to absorb oxygen, it is necessary for there to be for high humidity within the system, and these are thus not suitable for the application of the present invention enclosed in a sealed space with a painting.

For the use in the present invention, an organic oxygen absorbing agent based on an aliphatic hydrocarbon having an unsaturated group is preferable, and an organic oxygen absorbing agent based on a liquid oligomer such as a liquid butadiene oligomer, a liquid isoprene oligomer, a liquid acetylene oligomer, a liquid styrene butadiene copolymer, a liquid acrylonitrile butadiene copolymer, a liquid chloroprene oligomer, a liquid unsaturated polyester resin, or a natural rubber is more preferable. The organic oxygen absorbing agent based on liquid butadiene oligomers is particularly suitable for use in the present invention because the amount of gas generated after absorption of oxygen is small and there is almost no odor.

As a commercially available product, for example, an oxygen absorbing agent "RP-K agent" dedicated to cultural properties manufactured by Mitsubishi Gas Chemical Co., Ltd. can be exemplified. The RP-K agent has the function of reducing the oxygen concentration in a sealed container to less than 0.1% and preventing the oxidation of the protected object. The RP-K agent has little influence on the relative humidity in the closed container, and the relative humidity in the closed container is in equilibrium with the water content of the object.

Sealed space 4 is formed from transparent hard plate 2 and gas barrier material 3 in order to maintain a sealed condition. It is preferable to seal the junction between transparent hard plate 2 and gas barrier material 3 with a sealing material having gas barrier properties.

Generally, as a gas barrier material 3 form, a plastic container, a film bag, a metal container, a glass container etc. can be given as examples.

Gas barrier material 3 of the present invention is an element used in combination with transparent hard plate 2 that serves as the front element. For this application, the gas barrier material 3 is preferably composed of at least one selected from a metal and a vapor deposition film, and more preferably at least one selected from an aluminum tray, an aluminum film, an aluminum vapor deposited resin film, and a silicon oxide vapor deposited resin film. Specifically, an aluminum film laminated with a metal foil such as an aluminum foil can be given as an example.

As the sealing material of the present invention, a transparent sheet-type adhesive in which the junction is not noticeable is preferable, and for example, a heat-sensitive ethylene/vinyl acetate-based plastic adhesive sheet (BEVA® 371 Film, etc.) or a normal temperature pressure-sensitive acrylic adhesive sheet (such as 3M® acrylic foam tape) can be used.

Figure 2:
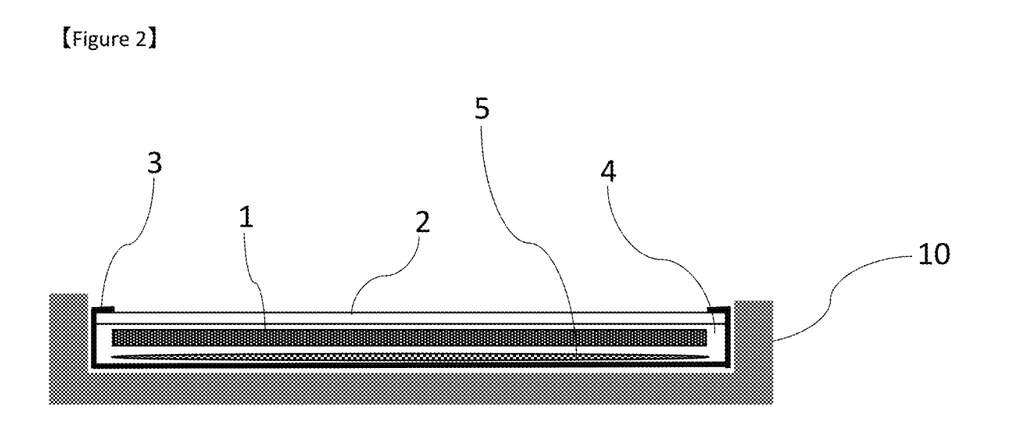
FIG. 2 is a drawing explaining the image surface protection structure of a painting according to an embodiment of the present invention in combination with a picture frame.

From the standpoint of adhesion, the larger the bonding area of transparent hard plate 2 and gas barrier material 3 is the more preferable, but because the present invention is premised on displaying a painting protected by the structure of the present invention in combination with a picture frame 10 as shown in FIG. 2, it is preferable that the gas barrier material 3 be completely contained in the picture frame 10 and not be visually recognizable from the outside when framed.

Figure 3:
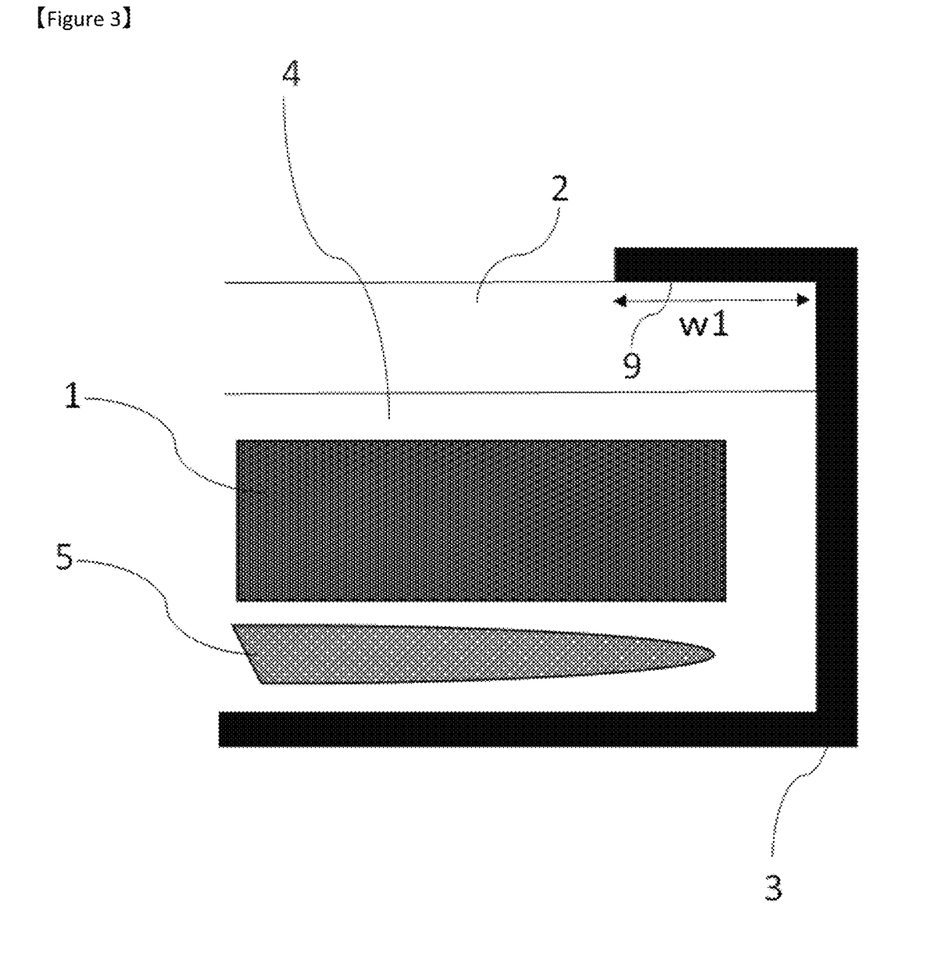
FIG. 3 is a drawing of the junction of the transparent hard plate and the gas barrier material of the embodiment in FIG. 1.
Figure 4:
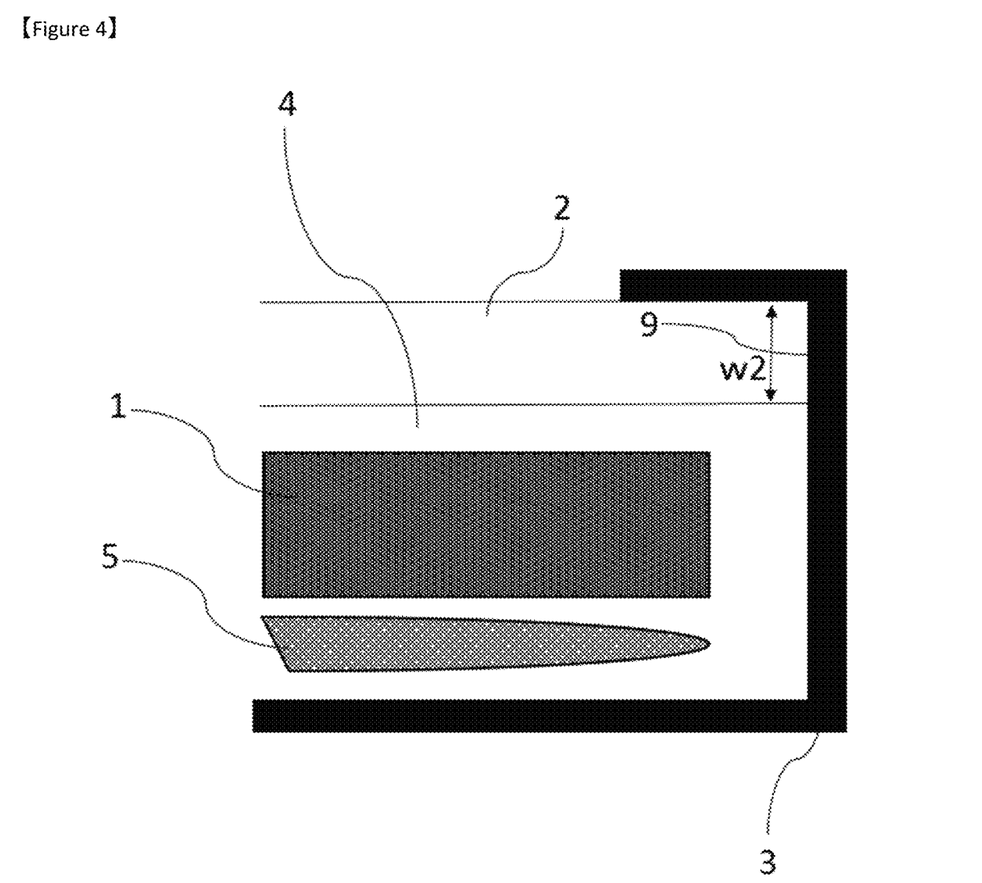
FIG. 4 is an expanded explanatory view of the junction of the transparent hard plate and the gas barrier material of the embodiment in FIG. 1.

For example, when using an aluminum film as the gas barrier material 3 as shown in FIG. 1, "The width (W1) of junction 9 between transparent hard plate 2 and the front surface of the barrier material 3" shown in FIG. 3, is preferably 3.0 to 7.0 mm, more preferably 4.0 to 6.0 mm, and even more preferably, 4.5 to 5.5 mm, and the "width (W2) of junction 9 between transparent hard plate 2 and the side surface of gas barrier material 3" shown in FIG. 4 is preferably 1.0 to 5.0 mm, more preferably 1.5 to 3.5 mm. and even more preferably 2.0 to 3.0 mm.

Figure 5:
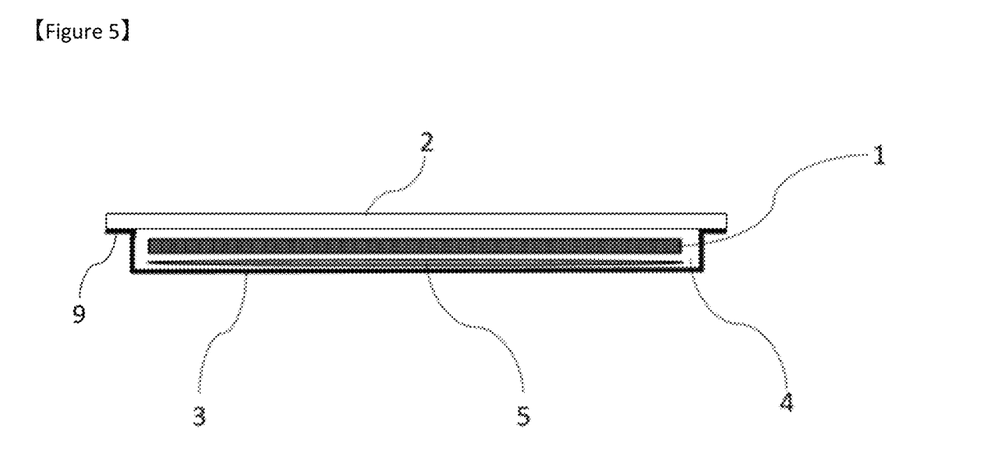
FIG. 5 is a drawing explaining the image surface protection structure of a painting according to another embodiment of the present invention.
Figure 6:
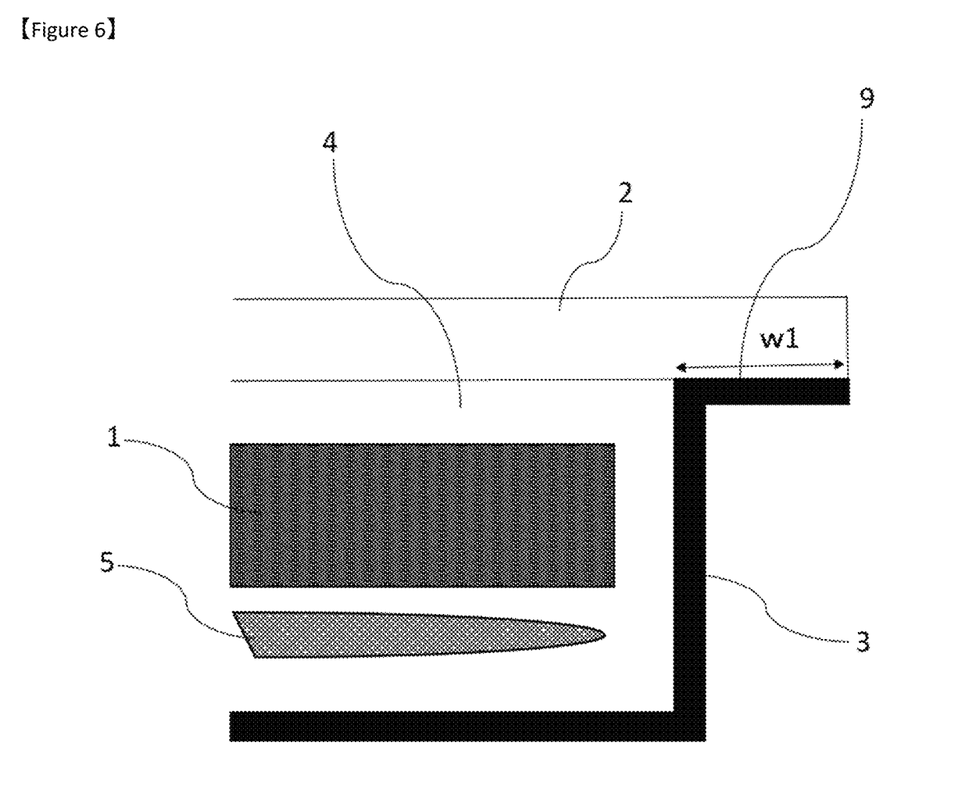
FIG. 6 is an expanded explanatory view of the junction of the transparent hard plate and the gas barrier material of the embodiment in FIG. 5.

For example, when using an aluminum tray as gas barrier material 3 as shown in FIG. 5, "the width (W 1) of junction 9 between transparent hard plate 2 and the front surface of gas barrier material 3" is preferably between 3.0 and 7.0 mm and more preferably from 4.0 to 6.0 mm.

It is preferable that the inside of sealed space 4 be maintained substantially in an oxygen-free state, and be maintained at a relative humidity described below suitable for painting 1. In order to maintain the inside of the sealed space 4 in the above state, the gas barrier material 3 preferably has "gas barrier performance" that the oxygen permeability at 25° C. and 60% RH is 50 ml/m$^2$·day·atm or less, and the water vapor permeability at 40° C. and 90% RH is 5 g/m$^2$·day or less.

Figure 7:
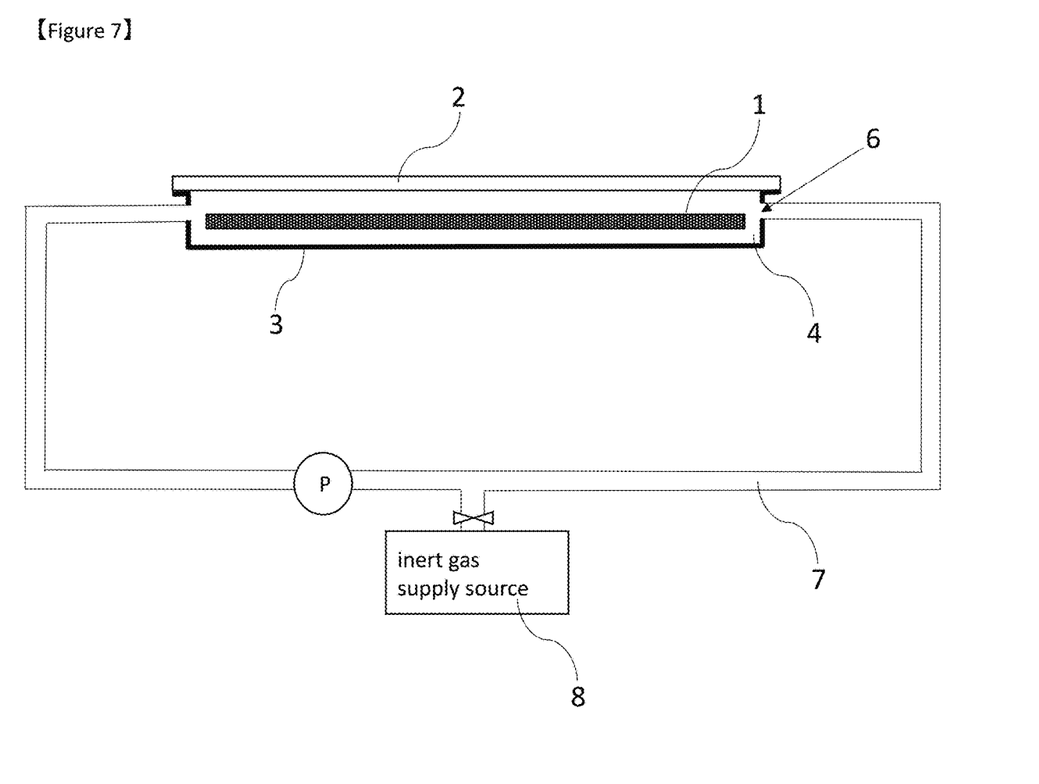
FIG. 7 is a drawing explaining the image surface protection structure of a painting according another embodiment of the present invention.

As described above, as a method of setting the oxygen concentration of sealed space 4 to 4% or less, in addition to the method of sealing the oxygen absorbing agent 5 together with painting 1 in sealed space 4, methods of performing gas replacement of the sealed space 4 with an inert gas such as nitrogen or argon may be given. Among them, the method of performing gas replacement can be realized by, for example, a structure in which holes 6 are provided on both sides of an aluminum tray which is the gas barrier material 3, circulation flow paths 7 connected to the holes 6 on both sides are provided, and inert gas supply sources 8 for supplying inert gas to the circulation flow paths 7 are provided, as shown in FIG. 7. Here, the inert gas used for the gas replacement is preferably a humidity control inert gas whose humidity is adjusted so that the relative humidity of sealed space 4 is maintained at 40 to 65% RH.

The oxygen permeability is even more preferably 10 ml/m$^2$·day·atm or less, and particularly preferably 1 ml/m$^2$·day·atm or less.

The water vapor permeability is even more preferably 1 g/m$^2$·day or less, particularly preferably 0.5 g/m$^2$·day or less.

As transparent hard plate 2, in addition to glass, a transparent resin containing at least one selected from the group consisting of acrylic resin, ene-thiol resin, polycarbonate resin, polyether resin, polyarylate resin, polysulfone resin, polyether sulfone resin, polyparaphenylene resin, polyarylene ether phosphine oxide resin, polyimide resin, -polyamideimide resin, cyclic olefin resin and polyester resin can be given as examples.

Although the present invention is intended for both paintings on display or paintings in storage, in particular, when a painting is displayed in combination with a picture frame, the method of the present invention can be suitably used for the purpose of protecting the image surface. In this case, transparent hard plate 2 is preferably a glass plate, a polycarbonate resin plate or an acrylic resin plate from the viewpoint of improving the visibility of the image surface of the displayed painting, and is particularly preferably a low reflection glass or a low reflection strengthened glass.

In the conventional method for protecting the surface of paintings using varnish, it is also physical damage of the painting (graffiti, chemicals, weapons, accident, adhesion of saliva, etc.) or environmental damage (fly feces adhesion, insect damage, occurrence of mold, water leakage, air pollution, salt damage, etc.) could not be avoided. However in the present invention, the painting is in sealed space 4 and the image surface (paint layer side) is protected by transparent hard plate 2, so it is possible to avoid such physical damage, environmental damage, and the like. In the absence of physical or human damage concerns, museums can also offer viewers a service that allows them to enjoy paintings at a much closer distance.

The relative humidity of sealed space 4 is preferably 40 to 65% RH, more preferably 50 to 60% RH, and still more preferably 50 to 55% RH.

The ICCROM (International Centre for the Study of the Preservation and Restoration of Cultural Property) examines the effects of temperature and humidity on various cultural properties in materials such as pigments, dyes, paper, and metals, and establishes optimal temperature and humidity standards. In this standard, "about 20° C., relative humidity 50 to 55% RH" is set as the standard humidity for oil paintings. And "about 20° C. and 55-65% RH" is defined as the standard of temperature and humidity for paper, wood, dyed products, and lacquer work. "About 20° C., relative humidity 45% RH" is defined as the standard temperature and humidity for metal and stone.

Traditionally, paintings have been displayed in a picture frame with almost no sealing. In public spaces such as art museums, the exhibition room itself is adjusted to the above criteria and handled.

However, in countries such as Japan where temperature and humidity change significantly throughout the four seasons, there is a problem in that it takes time and incurs cost to maintain an environment that meets the above standards throughout the year. In addition, there was the problem that the above environment could not be maintained while transporting the painting, and the deterioration of the paintings being transported might proceed.

On the other hand, in the present invention, sealed space 4 possessing high gas barrier properties is formed as described above, and it is possible for sealed space 4 to maintains, semi-permanently, the humidity (for example, 50% RH) when the painting is sealed. According to the present invention, since the relative humidity of sealed space 4 is always maintained in the optimum range for the painting, it is not necessary to control the temperature and humidity of the exhibition room as strictly as in the past, and the labor and cost required for controlling the temperature and humidity in the past can be greatly reduced.

In addition, it is possible to avoid deterioration during transportation of paintings.

The temperature of the air initially enclosed in sealed space 4 (i.e., the temperature at the time of the operation of enclosing the painting in the sealed space) is preferably 24° C. or less.

When high-temperature air above 24° C. is sealed in enclosed in sealed space 4, condensation may occur in sealed space 4 when the temperature of the environment in which the picture frame is placed drops when the painting is being displayed in combination with the picture frame. However, by setting the temperature to 24° C. or lower, such condensation can be avoided, and the generation of mold due to condensation can be avoided.

The temperature is preferably maintained at 18 to 24° C., more preferably at 18 to 23° C., and still more preferably at 20 to 22° C.

It is also possible to mix and use a gas absorbent and a humidity control agent with the oxygen absorbing agent 5 in the sealed space 4. These single agents or mixtures are suitably used in the form of powder, granules, tablets or sheets or the like. It is not desirable for the oxygen absorbing agent, gas absorbent, and moisture conditioner to directly touch the article to be stored, and, usually, for example, it is packaged in an air-permeable packaging material based on paper, non-woven fabric or plastic, and the like and used as a packaged unit. In addition, the oxygen absorbing agent may be partially or entirely packaged as part of a gas absorbent or a humidity control agent, or as a separate package. The form of the package is not particularly limited, and may be, for example, a pouch, a sheet, a blister package or the like, depending on the purpose. The packaging material and configuration of the package are not particularly limited. In addition, as a dustproof measure, it is also possible to make the package a body the that is further covered with a dust-free packaging material that does not affect the permeability of oxygen, inorganic gas, organic gas and moisture and does not release dust generated from the package to the outside, thereby creating a two-tier packaging.

However, when the package itself is already dustproof, it is not necessary to cover it again with a dust-free packaging material.

As described above, since the present invention is premised on displaying a painting protected by the structure of the present invention in combination with a picture frame, it is preferable that the gas barrier material 3 be completely contained in the picture frame and not be visually recognizable from the outside when framed. And the package is preferably arranged in the sealed space 4 formed of transparent hard plate 2 and gas barrier material 3.

The size of the package may be any size that can be accommodated in the sealed space 4 on the back side of the painting 1, but the thickness of the package is preferably 15 mm or less, more preferably 10 mm or less, even more preferably 8 mm or less, and most preferably 4 mm or less.

By setting the thickness of the package to 15 mm or less, there is a high possibility that an existing picture frame can be used as it is.

Since existing picture frames are also an important element of appreciation in many famous old paintings, it is of great technical significance to make the paintings semi-permanently protectable in a substantially deoxygenated space by the structure of the present invention while using the existing picture frames as they are by setting the thickness of the package to 15 mm or less.

The lower limit of the thickness of the package is not particularly limited, but is preferably 20 mm or more, more preferably 30 mm or more from the viewpoint of handling.

The gas absorbent mainly absorbs gas other than oxygen. Specifically, for example, it is a substance that absorbs a low-molecular-weight substance having high volatility contained before deoxidizing reaction to a liquid hydrocarbon oligomer having an unsaturated group as an oxidizable main component; or it is a substance that absorbs gas components such as hydrogen, carbon monoxide, carbon dioxide, hydrocarbons, aldehydes, ketones, carboxylic acids, etc. produced in the deoxygenation reaction, or it is a substance that absorbs corrosive gas components of the sealed atmosphere such as hydrogen sulfide and ammonia. However, there is no particular limitation as long as this purpose is achieved. As gas absorbents, synthetic zeolites such as aluminum oxide molecular sieves, natural zeolites such as mordenite and erionite, clay minerals such as pearlite, acidic clay and activated clay, porous glass such as silica gel, activated carbon and activated carbon fiber-activated carbons such as molecular sieve carbon and bone charcoal, oxides of alkaline earth metals such as calcium oxide, barium oxide and magnesium oxide, hydroxides such as sodium hydroxide, potassium hydroxide and slaked lime, magnesium silicate, aluminum silicate, polymer adsorbent, sodium sulfate, sodium carbonate, potassium carbonate, soda lime, ascarite, organic acid salt, organic amines and the like can be used.

In addition, it is also a practical use method to select a carrier of the main agent to be oxidized as a gas absorbent and to give it a gas absorbing ability, and in this case, it is not necessary to add the gas absorbent again.

Furthermore, these gas absorbents do not necessarily have to be a single substance, and may be a mixture of two or more.

The amount of gas absorbent required varies depending on the absorption capacity of the gas absorbent, but an amount capable of substantially removing the gas contained in the main agent before oxygen absorption and from the gas generated after oxygen absorption must be appropriately selected.

The humidity control agent is not particularly limited as long as it regulates the relative humidity in the sealed space 4 to a predetermined value.

As the humidity control agent cotton, paper, diatomaceous earth, etc. impregnated with saturated aqueous solution of any one of the group consisting of barium chloride dihydrate, potassium acetate, sodium acetate trihydrate, calcium chloride hexahydrate, calcium nitrate tetrahydrate, calcium sulfate pentahydrate, chromium trioxide, oxalic acid dihydrate, phosphoric acid ½ hydrate, potassium bromide, potassium fluoride, potassium hydrogen sulfate, potassium iodide, potassium nitrite, potassium carbonate dihydrate, potassium perchromate, lithium chloride monohydrate, magnesium acetate tetrahydrate, magnesium nitrate hexahydrate, ammonium chloride, ammonium sulfate, sodium bromide, sodium bromide dihydrate, sodium bromate, sodium chlorate, sodium fluoride, sodium iodide, sodium nitrite, sodium carbonate decahydrate, sodium dichromate dihydrate, sodium sulfate decahydrate, lead nitrate, zinc nitrate hexahydrate, zinc sulfate heptahydrate can be used.

Moreover, cotton, paper, diatomaceous earth, etc. impregnated with a water/glycerin mixed solution can be used.

Moreover, paper, cotton, leather, rubber, wood, charcoal, etc., containing moisture for the equilibrium moisture content can be used.

The amount of the humidity control agent used is at least the amount necessary to maintain the relative humidity of the sealed space 4 at 40 to 65% RH, and preferably in the range of 1.1 to 500 times of that amount.

According to the present invention in the above configuration, it is possible for the paint layer of the painting to be semi-permanently protected from dirt, physical injuries and the like without using varnish; that is, without impairing the original color or texture of the paint layer. In addition, according to the present invention in the above configuration, it is possible to always display a painting under humidity conditions optimum for the painting, regardless of the humidity conditions of the painting display room.

REFERENCE SIGNS LIST 1 painting
2 transparent hard plate
3 gas barrier material
4 sealed space
5 oxygen absorbing agent
6 holes
7 circulation channels
8 inert gas supply source
9 junction
10 picture frame

The invention claimed is:

1. An image surface protection structure of a painting comprising:
   a transparent hard plate;
   a gas barrier material; and
   an oxygen absorbing agent,
   wherein a sealed space having an oxygen concentration of 1% or less is formed by the transparent hard plate and the gas barrier material, and a junction between the transparent hard plate and the gas barrier material is sealed by a sealing material,
   a painting and the oxygen absorbing agent are placed in the sealed space, and an image surface of the painting faces the transparent hard plate, and
   a width of the junction between transparent hard plate and a front surface of the barrier material is 3.0 to 7.0 mm.

2. The image surface protection structure of a painting according to claim 1, wherein the oxygen absorbing agent is placed on a back side of the painting.

3. The image surface protection structure of a painting according to claim 1, wherein the relative humidity of the sealed space is 40 to 65% RH.

4. The image surface protection structure of a painting according to claim 1, wherein the oxygen absorbing agent is an organic oxygen absorbing agent.

5. The image surface protection structure of a painting according to claim 1, wherein the gas barrier material is at least one selected from a metal and a vapor deposition film.

6. The image surface protection structure of a painting according to claim 1, wherein the gas barrier material possesses the form of a tray or a film.

7. The image surface protection structure of a painting according to claim 5, wherein the metal is aluminum.

8. The image surface protection structure of a painting according to claim 5, wherein the vapor deposition film is at least one selected from an aluminum vapor deposition resin film and a silicon oxide vapor deposition resin film.

9. The image surface protection structure of a painting according to claim 1, wherein the transparent hard plate is selected from the group consisting of a glass plate, a polycarbonate plate, and an acrylic resin plate.

10. The image surface protection structure of a painting according to claim 9, wherein the glass plate is made of low reflection glass or low reflection strengthened glass.

11. The image surface protection structure of a painting according to claim 1, wherein the sealing material is a transparent sheet-type adhesive.

12. The image surface protection structure of a painting according to claim 11, wherein the transparent sheet-type adhesive is a heat-sensitive ethylene/vinyl acetate-based plastic adhesive sheet or a normal temperature pressure-sensitive acrylic adhesive sheet.

\* \* \* \* \*